(12) United States Patent
Visconti et al.

(10) Patent No.: US 8,355,843 B2
(45) Date of Patent: Jan. 15, 2013

(54) CONTROL METHOD AND DEVICE FOR A VEHICLE FOR SIGNALING WHEN THE OPTIMAL WORKING TEMPERATURE OF TIRES AND BRAKES IS REACHED

(75) Inventors: Amedeo Visconti, Turin (IT); Antonio Calvosa, Milan (IT); Martino Cavanna, Vimercate (IT)

(73) Assignee: Ferrari S.p.A., Modena (IT)

( * ) Notice: Subject to any disclaimer, the term of this patent is extended or adjusted under 35 U.S.C. 154(b) by 813 days.

(21) Appl. No.: 12/536,928

(22) Filed: Aug. 6, 2009

(65) Prior Publication Data

US 2010/0087991 A1 Apr. 8, 2010

(30) Foreign Application Priority Data

Aug. 6, 2008 (IT) ............... BO2008A0510

(51) Int. Cl.
 *G06F 7/00* (2006.01)
 *G06F 17/00* (2006.01)
(52) U.S. Cl. .......................... 701/48; 701/36
(58) Field of Classification Search ............... 701/31.4, 701/48, 36; 702/138, 140, 127, 130, 131; 188/79.52; 340/438, 442, 445, 449; 73/146; 374/E13.008, E13.01
 See application file for complete search history.

(56) References Cited

U.S. PATENT DOCUMENTS

| | | | | |
|---|---|---|---|---|
| 7,086,503 B2 * | 8/2006 | Miller et al. | ............. | 188/1.11 L |
| 7,497,305 B2 * | 3/2009 | Miller et al. | ............. | 188/1.11 E |
| 7,506,941 B2 * | 3/2009 | Miller et al. | .................. | 303/191 |
| 8,026,802 B2 * | 9/2011 | Shimura | ...................... | 340/442 |
| 2004/0021561 A1 * | 2/2004 | Sasaki et al. | .................. | 340/445 |
| 2007/0295072 A1 | 12/2007 | Fagot-Revurat et al. | | |
| 2008/0018445 A1 * | 1/2008 | Shimura | ...................... | 340/442 |
| 2010/0256874 A1 * | 10/2010 | Carresjo et al. | ................. | 701/48 |
| 2010/0256946 A1 * | 10/2010 | Carresjo et al. | ............... | 702/138 |
| 2010/0274441 A1 * | 10/2010 | Carresjo | ......................... | 701/33 |
| 2010/0274607 A1 * | 10/2010 | Carresjo et al. | .................. | 705/7 |

FOREIGN PATENT DOCUMENTS

JP 2002-224113 * 7/2002

(Continued)

OTHER PUBLICATIONS

Design and Implementation of TPMS Based on Wireless Sensor Network; Liu Yueming et al., Intelligent System Design and Engineering Application (ISDEA), 2010 International Conference on; vol. 1; Digital Object Identifier: 10.1109/ISDEA.2010.436 Publication Year: 2010, pp. 518-523.*

(Continued)

*Primary Examiner* — Cuong H Nguyen
(74) *Attorney, Agent, or Firm* — Graybeal Jackson LLP

(57) ABSTRACT

An embodiment of a control method for a vehicle which is provided with a number of wheels, each of which comprises a tire and at least a disc brake of a braking system; the control method includes the step of sensing the current temperature of at least one component of a respective wheel by means of at least one sensor; determining, in a step of engineering and setting up, at least one first predetermined threshold value indicating the minimum temperature from which the component of wheel shows its maximum efficiency; comparing the current temperature of the component of wheel with the first predetermined threshold value; and signaling to the driver when the current temperature of the component of wheel is lower than the first predetermined threshold value.

7 Claims, 2 Drawing Sheets

FOREIGN PATENT DOCUMENTS

| JP | 2004069336 | | 3/2004 |
|---|---|---|---|
| JP | 2004069336 A | * | 3/2004 |
| JP | PCT/JP05/23319 | * | 5/2007 |
| WO | PCT/GB01/03494 | * | 2/2001 |
| WO | WO2006/068113 | * | 6/2006 |

OTHER PUBLICATIONS

Research on the Influence Factors of the Braked Force Coefficient; Yazhong Guo et al.; Cryptography and Network Security, Data Mining and Knowledge Discovery, E-Commerce & Its Applications and Embedded Systems (CDEE), 2010 First ACIS International Symposium on; Digital Object Id..: 10.1109/CDEE.2010.76; Pub. Year: 2010, pp. 366-369.*

Wirelessly interrogable surface acoustic wave sensors for vehicular applications; Pohl, A.; Seifert, F.; Instrumentation and Measurement, IEEE Transactions on; vol. 46, Issue: 4; Digital Object Identifier: 10.1109/19.650822 Publication Year: 1997, pp. 1031-1038.*

Italian Search Report for Italian Application Serial No. BO20080510, Munich, Mar. 4, 2009.

European Search Report for European Application Serial No. EP09167305, European Patent Office, Munich, Oct. 29, 2009.

* cited by examiner under the pressure applied to it during the compression and extension steps of the suspension, a temperature sensor, or the combination of the two sensors.

CONTROL METHOD AND DEVICE FOR A VEHICLE FOR SIGNALING WHEN THE OPTIMAL WORKING TEMPERATURE OF TIRES AND BRAKES IS REACHED

PRIORITY CLAIM

The present application claims the benefit of Italian Patent Application Serial No. BO2008A000510, filed Aug. 6, 2008, which application is incorporated herein by reference in its entirety.

TECHNICAL FIELD

An embodiment of the present invention relates to a control method for a vehicle.

An embodiment of the present invention is advantageously applied to an automobile, to which explicit reference will be made in the following description without a loss in generality.

BACKGROUND

An automobile has four wheels, each of which comprises a tire and a brake disc of a braking system. In general, the performance offered by the rotary components of each wheel, i.e., tire and brake disc, depends on the current temperature of the rotary components themselves; the subordination of the performance of the rotary components of each wheel according to their current temperature is very apparent in sports automobiles, in which particular materials are used (e.g., carbon-ceramic alloys for brake discs or high-grip compounds in tire treads), which provide a very high performance in relatively narrow temperature ranges.

In order to avoid an excessive overheating of the rotary components of each wheel (with a consequent very apparent performance decay), it has been suggested to install a monitoring and control system of the temperature of tires and/or brake discs in an automobile. In particular, the known monitoring and control systems signal through a display placed on the dashboard of the automobile itself when the brake discs and/or tires have reached temperatures higher than a safety limit value and so as to jeopardize their correct operation and determine unsafe driving conditions of the automobile. An example of a monitoring and control system is provided in patent application US2007295072A1, and which is incorporated by reference, in which a monitoring and control system of the temperature of tires of an automobile is described, which system comprises a plurality of wireless-type sensors, which are arranged inside the tires themselves and, in particular, are embedded in the tire tread.

However, the known monitoring and control systems are not able to provide complete information on the actual efficiency of the rotary components of each wheel, i.e., of the tire and brake disc of each wheel, to the driver of a high-performance sports automobile.

SUMMARY

An embodiment of the present invention is a control method and device for an automobile, which are free from the above-described drawbacks while being cost-effective and simple to be implemented.

BRIEF DESCRIPTION OF THE DRAWINGS

An embodiment of the present invention will now be described with reference to the accompanying drawings illustrating a non-limitative embodiment thereof, in which.

DETAILED DESCRIPTION

Figure 1:
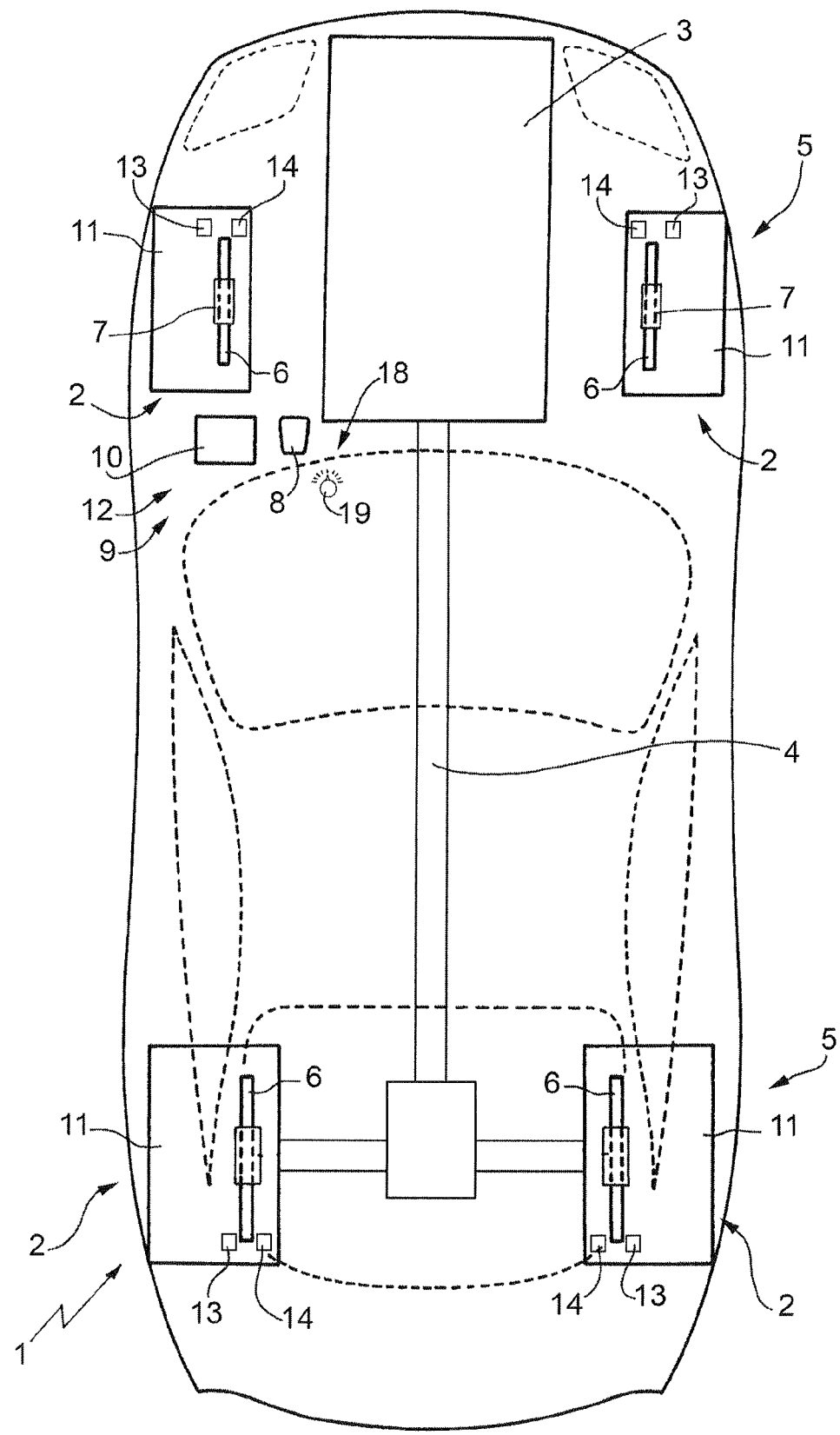
FIG. 1 is a diagrammatic, plan view of an automobile implementing a control method according to an embodiment of the present invention.

In FIG. 1, numeral 1 indicates as a whole an automobile provided with four wheels 2 (two front wheels and two rear drive wheels) and comprising a front internal combustion engine 3, which produces a driving torque that is transmitted to the rear wheels 2 by means of a driveline 4.

Automobile 1 is provided with a braking system 5 having four brake discs 6; two discs 6 are arranged inside a respective front wheel 2 and two discs 6 are arranged inside a respective rear wheel 2. Each disc 6 is coupled to a respective caliper 7, which is controlled by a brake pedal 8 arranged in a passenger compartment of the automobile 1 and operated by the driver.

Automobile 1 further comprises a control device 9 of the automobile 1 itself, which is provided with a control unit 10 connected both to the braking system 5 and to the wheels 2. In particular, the control unit 10 is adapted to sense and store the working temperature value of brake discs 6 and tires 11 of the front and rear wheels 2 by means of a sensing device 12 of the temperatures, which comprises a plurality of sensors 13 coupled to the tires 11 and a plurality of sensors 14 coupled to the brake discs 7. It has indeed been observed that the performance provided by automobile 1 and the wear of tires 11 and braking system 5, respectively, are strongly affected by the working temperatures reached by the tires 11 themselves and by the disc brakes 6.

Each sensor 13 is embedded in the tread for sensing the working temperature of a respective tire 11 and is of the wireless and battery-less type. Thereby, the sensor 13 does not require any connection wires to the control unit 10 and is able to work without the presence of an energy supplying battery, because it is self-powered by means of the motion of the tire 11 itself. In this case, the sensors 13 could be piezoelectric sensors, which comprise a series of crystals the property of which is to generate an electrical charge proportional to the force applied during the motion of the tire 11 when subjected to mechanical stress.

The wear of the braking system 5 depends on the working temperature reached by the brake discs 6, which is sensed by means of the sensors 14. Furthermore, the same amount of dissipated energy generates a different wear according to the conditions of use, and in particular wear is much higher during a high-performance use of the automobile 1, in which the temperatures reached by the brake discs 6 are substantially high as compared to the use under normal conditions. It is worth emphasizing that the possibility of controlling the working temperatures of the braking system 5 may be very important, because it has been demonstrated that the braking power of the automobile 1 when cold is considerably lower than the braking power under normal conditions of operation; this reduction is substantially high and equal to about 30% of the braking power. A step of warming up the braking system 5 may thus be needed, the duration of which was simply determined, until now, by the driver.

Figure 2:
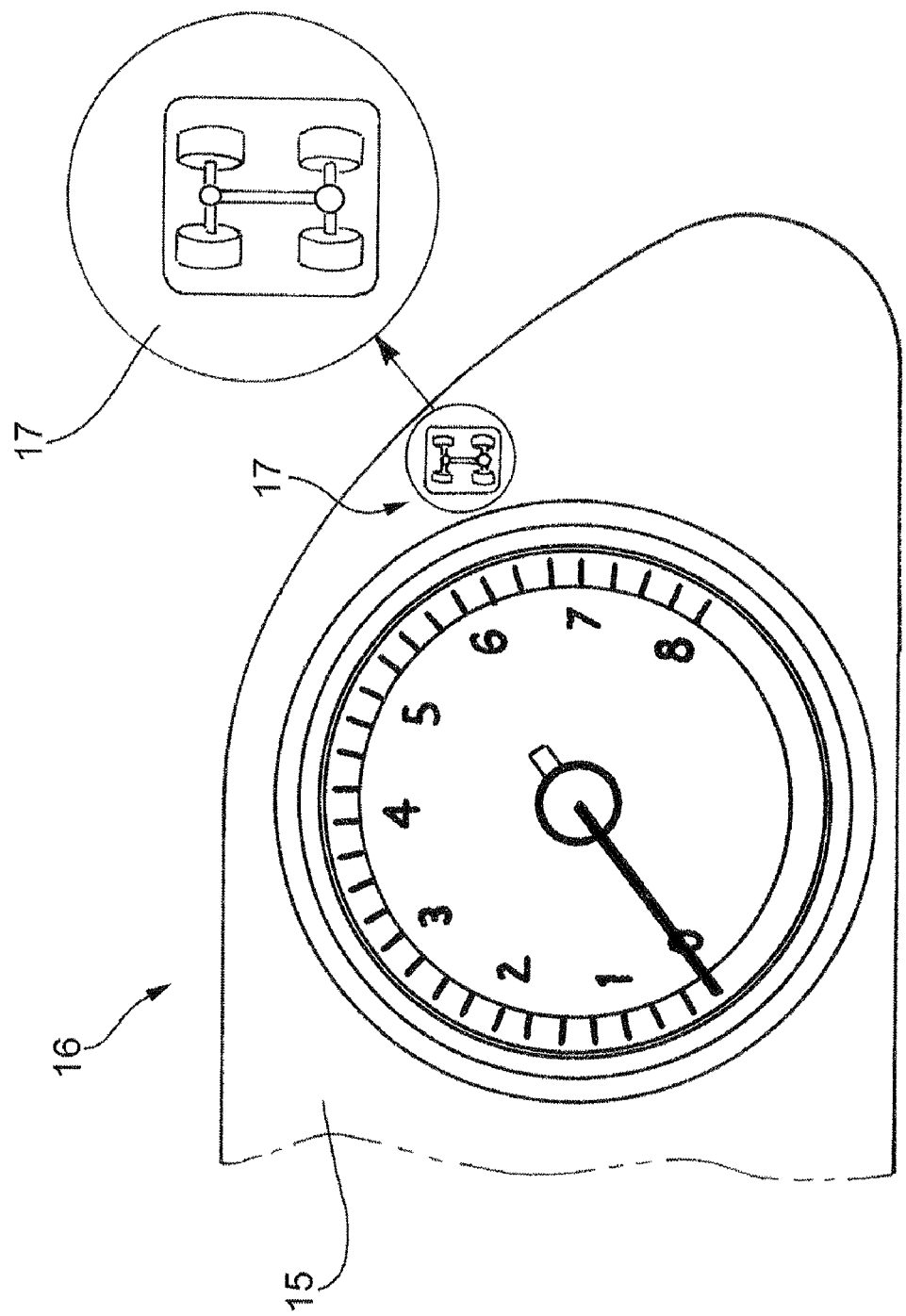
FIG. 2 shows a detail of an embodiment of an indicator instrument of the automobile in FIG. 1 on an enlarged scale.

FIG. 2 partially shows the onboard instrumentation 15 of a dashboard 16, comprising an indicator device 17 of the working temperatures of the braking system 5 and wheels 2. The indicator device 17 is illuminated by a light source (not shown), connected to the control unit 10, and adapted to signal, in use, when the braking system 5 and the wheels 2 have reached an optimal working temperature.

In particular, the sensors 13 and 14 periodically sense the temperatures of tire 11 and brake disc 6, respectively, and the control unit 10 is intended to compare the sensed temperature value with a pair of predetermined threshold values. These values represent the bounds of a temperature range characterizing the optimal operation of the automobile 1. First, the control unit 10 compares the sensed temperature with a threshold value $T_{min}$; if the sensed temperature is lower, the control unit 10 is set up to send a signal to the driver through the indicator device 17. Instead, if the sensed temperature is higher than the threshold value $T_{min}$, the control unit 10 compares the sensed temperature with the threshold value $T_{max}$. If the sensed temperature is higher than the threshold value $T_{max}$, the control unit 10 is set up to send a signal to the driver through the indicator device 17 also in this case. The indicator device 17 is not illuminated in the time range in which the working temperatures are kept within the range between the two threshold values $T_{min}$ and $T_{max}$. As soon as the sensed temperatures are no longer within this optimal operating range, the control unit 10 sends a signal to the driver by lighting up the light source (not shown) and illuminating the indicator device 17. Alternatively, the control unit 10 may send a signal to indicate the working temperatures are within range, or may send a first signal to indicate an out-of-range condition and a second signal to indicate an in-range condition.

In use, when the automobile 1 is started, the light source (not shown) is turned on to be able to inform the driver that both brake discs 6 and tires 11 are cold, i.e., have not reached the threshold value $T_{min}$ and prudence is thus recommended to allow the components of the automobile 1 to reach an optimal working temperature at which they may provide their maximum performance. Instead, when the light source (not shown) is turned off, it means that the step of warming up has ended and all the brake discs 6 and tires 11 have reached a temperature such that safe driving conditions of the automobile 1 are determined.

As shown in FIG. 1, automobile 1 is further provided with a passenger compartment in which there are the dashboard 16 (partially shown in FIG. 2), the brake pedal 9 for controlling the braking system 5, and a selection device 18, usually named "joystick", which allows the driver to communicate the desired driving mode of the automobile 1 to the control unit 10 (e.g., sporty driving on a race track, normal driving on a road open to the public, driving on wet road, etc.).

The selection device 18 may take, for example, five different positions, each corresponding to a given dynamic behavior of the automobile 1 and to which five different threshold values $T_{min}$ and five different threshold values $T_{max}$ correspond. The bounds and amplitude of the temperature range which determine the optimal operating conditions of the automobile are thus variable according to the position taken by the selection device 18, so as to be able to optimize different parameters depending on the driver's choice (e.g., comfort or performance of the automobile 1).

In particular, the selection device 18 comprises a rotary switch 19, which may take the five different positions and is connected to the control unit 10. According to the driver's choice, i.e., to the position taken by the rotary switch 19, the control unit 10 varies the intervention parameters of the various electronic devices (such as, for example, ABS, ESP, etc.) so as to make the dynamic behavior of the automobile 1 as close to the driver's wishes as possible; in other words, the control unit 10 is set to control some parameters including, for example, suspension adjustment, stability and traction control, etc. Furthermore, according to the position taken by the rotary switch 19, the control unit 10 is set to compare the working temperatures sensed by the sensors 13, 14, with the respective threshold values $T_{min}$ and $T_{max}$ in order to establish if the sensed working temperatures are within the optimal operation range.

Since drivers often estimate their driving skills incorrectly, in particular they usually tend to overestimate them, the control unit 10 is set to limit the performance of the automobile 1 according to the conditions of braking system 5 and wheels 2, i.e., according to the working temperatures sensed by the sensors 13 and 14.

Being connected to a plurality of sensors distributed inside the automobile, including the sensors 13 and 14, the control unit 10, which supervises the operation of the active parts of automobile 1, is able to limit the performance of the automobile 1 according to the working temperatures sensed by the sensors 13 and 14, and in particular until the sensed temperature are at least equal to the threshold value $T_{min}$. Thereby, if the drivers overestimates their conditions or do not correctly evaluate the conditions of the road on which they are traveling, the performance of the automobile 1 will thus be such to ensure safer driving conditions until the braking system 5 and the tires 11 have reached a working temperature within the optimal operating range.

In the automobile 1 shown in FIG. 1, each wheel 2 is provided with a respective sensor 13 for sensing the working temperature of the tire 11, and a respective sensor 14 for sensing the working temperature of the brake disc 6. According to a further embodiment (not shown in the figures), the front wheels 2 of the automobile 1 are provided with a temperature sensing device 12 only, i.e., with a respective sensor 13 for sensing a working temperature of the tire 11 and with a respective sensor 14 for sensing the working temperature of the brake disc 6. This embodiment may be applied because it helps to contain costs while allowing to control the temperatures of the rotary components of the front wheels 2, which are the most stressed both during the step of braking and during the step of steering.

According to a further embodiment (not shown in the figures), the above-described control method is implemented on a motorcycle for signaling when the optimal working temperature of tires and brakes is reached; also in this case, the front wheel only, or alternatively both the wheels of the motorcycle are provided with the temperature sensing device, i.e., with a respective sensor for sensing the working temperature of the tire, and with a respective sensor for sensing the working temperature of the brake disc.

According to a further embodiment (not shown in the figures), the control unit 10 of the control device 9 is set to estimate the temperature value of tires 11 and brake discs 7 through a thermal balance model. The model includes evaluating and balancing the energy contribution of a plurality of parameters (such as for example external temperature, radiation index, drift angle, etc.) in order to be able to correctly estimate the correct temperature of tires 11 and brake discs 7.

It is worth underlining that, according to this further embodiment, the control device does not require the presence of sensors 13 and 14 coupled to the tires 11 and brake discs 7, respectively, because, through the thermal balance model, the control unit 10 is set to self-estimate the temperature of these components and a physical connection of the control unit 10 itself both to the braking system 5 and to the wheels 2 is no longer needed.

Naturally, in order to satisfy local and specific requirements, a person skilled in the art may apply to the embodiments described above many modifications and alterations. Particularly, although one or more embodiments have been described with a certain degree of particularity, it should be understood that various omissions, substitutions, and changes in the form and details as well as other embodiments are possible. Moreover, it is expressly intended that specific elements and/or method steps described in connection with any disclosed embodiment may be incorporated in any other embodiment.

What is claimed is:

1. Control method for a vehicle provided with a number of wheels, each of which comprises a tire and at least a disc brake of a braking system; the control method comprises the step of sensing the current temperature of at least one rotary component of at least one wheel;
    determining, in a preliminary step of engineering and setting up, at least one first predetermined threshold value indicating the minimum temperature from which the rotary component of wheel shows a desired efficiency;
    comparing the current temperature of the rotary component of wheel with the first predetermined threshold value;
    signaling to the driver when the current temperature of the rotary component of wheel is lower than the first predetermined threshold value;
    determining, in a preliminary step of engineering and setting up, a first predetermined threshold value of the tire indicating the minimum temperature from which the tire of wheel shows a desired efficiency and a first predetermined threshold value of the disc brake indicating the minimum temperature from which the disc brake of wheel shows a desired efficiency;
    sensing the current temperature of the tire of at least one wheel and the current temperature of the disc brake of wheel;
    comparing the current temperature of the tire of wheel with the first predetermined threshold value of the tire, and the current temperature of the disc brake of wheel with the first predetermined threshold value of the disc brake; and
    signaling to the driver when the current temperature of the tire of wheel is lower than the first predetermined threshold value of the tire and/or signaling to the driver when the current temperature of the disc brake of wheel is lower than the first predetermined threshold value of the disc brake.

2. A method according to claim 1 and comprising the further steps of:
    recognizing the driver's choice of a desired driving mode for the vehicle; and
    varying the first predetermined threshold value according to the desired driving mode of the vehicle.

3. A method according to claim 1 and comprising the further step of limiting the maximum performance of the vehicle when the temperature of the rotary component of wheel is lower than the first predetermined threshold value.

4. A method according to claim 1, comprising the further steps of:
    determining, in a step of engineering and setting up, at least a second predetermined threshold value which is higher than the first predetermined threshold value and indicates the maximum working temperature of the rotary component of wheel;
    comparing the current temperature of the rotary component of wheel with the second predetermined threshold value; and
    signaling to the driver when the current temperature of the rotary component of wheel is higher than the second predetermined threshold value.

5. A method according to claim 4 and comprising the further steps of:
    recognizing the driver's choice of a desired driving mode of the vehicle; and
    varying the second predetermined threshold value according to the desired driving mode of the vehicle.

6. A method according to claim 4, comprising the further step of limiting the maximum performance of the vehicle when the temperature of the rotary component of wheel is higher than the second predetermined threshold value.

7. A method according to claim 1, comprising the further steps of:
    determining, in a preliminary step of engineering and setting up, a second predetermined threshold value of the tire indicating the maximum working temperature of the tire and a second predetermined threshold value of the disc brake indicating the maximum working temperature of the disc brake;
    sensing the current temperature of the tire of at least one wheel and the current temperature of the disc brake of wheel;
    comparing the current temperature of the tire of wheel with the second predetermined threshold value, and the current temperature of the disc brake of wheel with the second predetermined threshold value of the disc brake; and
    signaling to the driver when the current temperature of the tire of wheel is higher than the second predetermined threshold value of the tire and/or signaling to the driver when the current temperature of the disc brake of wheel is higher than the second predetermined threshold value of the disc brake.

* * * * *